United States Patent

Bungo

[11] Patent Number: 6,106,327
[45] Date of Patent: Aug. 22, 2000

[54] SENSOR CONNECTION ASSEMBLY

[75] Inventor: Edward Martin Bungo, Cortland, Ohio

[73] Assignee: General Motors Corporation, Detroit, Mich.

[21] Appl. No.: 09/135,094

[22] Filed: Aug. 17, 1998

[51] Int. Cl.[7] .................................................. H01R 13/44
[52] U.S. Cl. .......................... 439/492; 439/125; 439/913
[58] Field of Search .................................... 439/499, 913, 439/492, 67, 77, 933, 130, 164, 15; 73/119 R, 756

[56] References Cited

U.S. PATENT DOCUMENTS

| | | | |
|---|---|---|---|
| 4,969,352 | 11/1990 | Sellnau | 73/115 |
| 5,159,525 | 10/1992 | Tate | 361/283 |
| 5,329,809 | 7/1994 | Sellnau et al. | 73/115 |
| 5,367,904 | 11/1994 | Sellnau | 73/115 |
| 5,584,704 | 12/1996 | Romann et al. | 439/130 |
| 5,823,802 | 10/1998 | Bartley | 439/86 |

Primary Examiner—Gary F. Paumen
Assistant Examiner—Ross Gushi
Attorney, Agent, or Firm—Richard A. Jones

[57] ABSTRACT

A sensor connection assembly for connection to a sensor in an internal combustion engine includes a connector housing and a flexible printed circuit disposed in the connector housing and having a plurality of legs to contact the sensor to provide an electrical connection thereto.

18 Claims, 2 Drawing Sheets

U.S. Patent  Aug. 22, 2000  Sheet 1 of 2  6,106,327
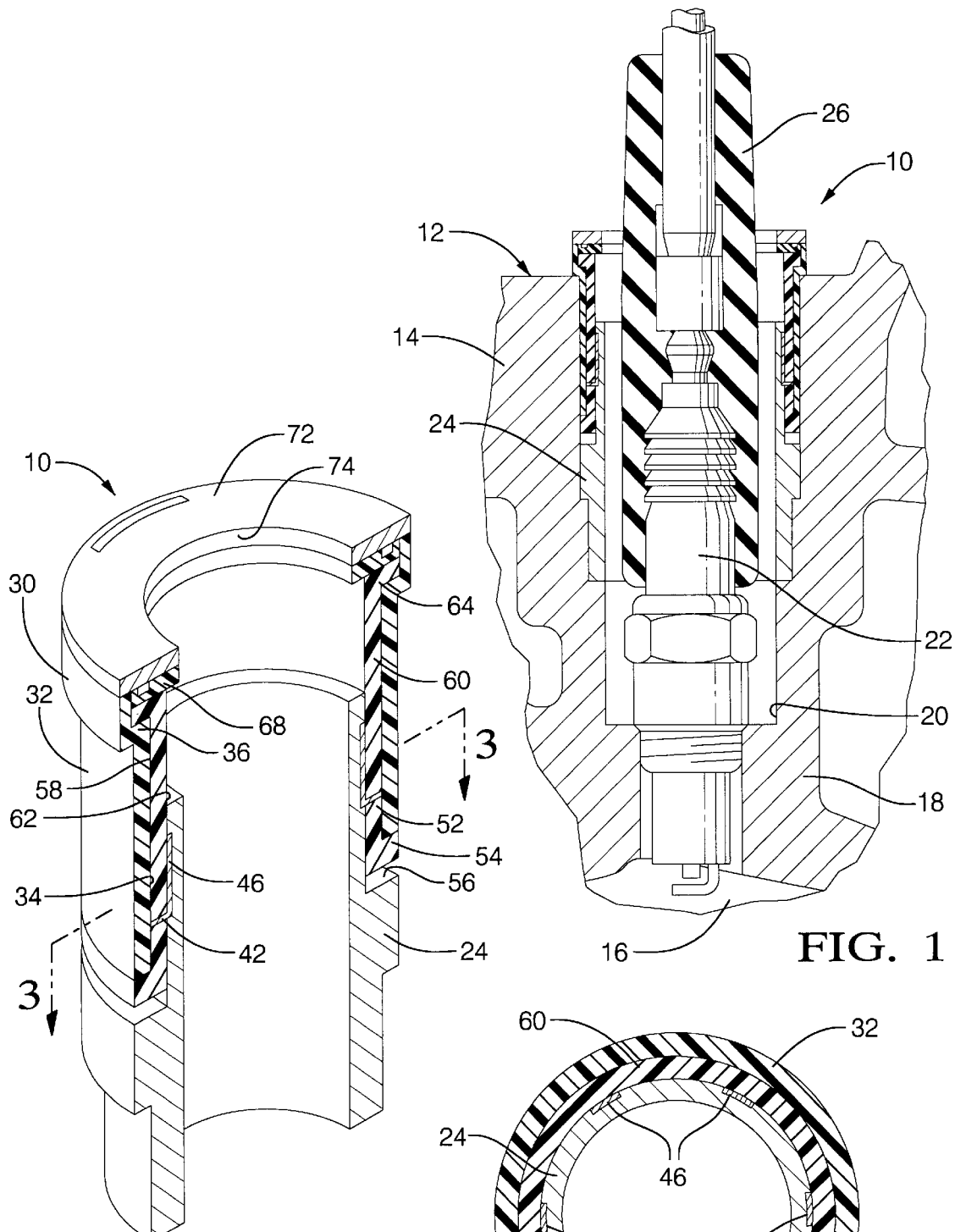
FIG. 1
FIG. 2
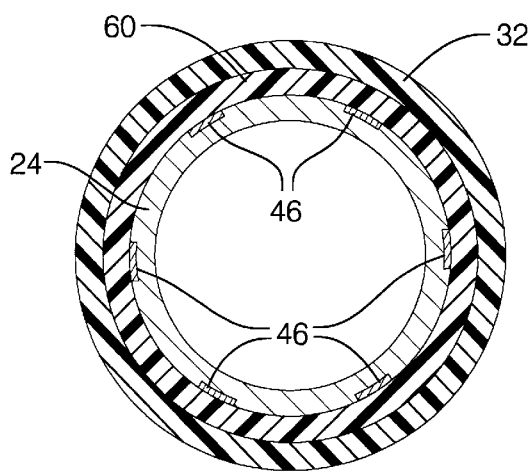
FIG. 3

SENSOR CONNECTION ASSEMBLY

TECHNICAL FIELD

The present invention relates generally to connectors for engines and, more particularly, to a sensor connection assembly for an internal combustion engine.

BACKGROUND OF THE INVENTION

It is known to provide a sensor to sense pressure in a combustion chamber for a cylinder of an internal combustion engine. The sensor is typically of a strain gage type that can also detect cylinder misfires and knock and can advance or retard ignition timing accordingly. It is also known to provide a signal level connection assembly between the sensors (one for each cylinder) and an electronic controller. The controller monitors the combustion process through the sensor and adjusts the ignition timing to the proper level.

Typically, the connection assembly includes a rigid frame with a plurality of fixed connector housings, electrical contacts, seals and a cover plate. The connection assembly is assembled to the sensors and secured to the engine. The primary function of the connection assembly is to maintain an electrical connection to the sensors and the controller. Other functions of the connection assembly are to seal out dust and fluids, provide EMI protection from the primary ignition source, and provide compatibility with coil or plug applications.

The sensors and connection to them are located in the hostile environment on the internal combustion engine. Because of this environment and the requirement to package the connection assembly with secondary wiring, the connection assembly needs to be sealed and shielded. Therefore, there is a need in the art to provide a sensor connection assembly on an internal combustion engine which is sealed and shielded and is packaged in a very restricted space for a non-oriented connection to the sensor.

SUMMARY OF THE INVENTION

Accordingly, the present invention is a sensor connection assembly for connection to a sensor on an internal combustion engine. The sensor connection assembly includes a connector housing and a flexible printed circuit disposed in the connector housing and having a plurality of legs to contact the sensor to provide an electrical connection thereto.

One advantage of the present invention is that a sensor connection assembly is provided for an internal combustion engine. Another advantage of the present invention is that the sensor connection assembly has a flexible circuit which is shielded. Yet another advantage of the present invention is that the sensor connection assembly has a terminal-base contact. Still another advantage of the present invention is that the sensor connection assembly has contact forces provided by elastomeric material. A further advantage of the present invention is that the sensor connection assembly has multiple contact points for reliability.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a fragmentary elevational view of a sensor connection assembly, according to the present invention, illustrated in operational relationship with an internal combustion engine.

FIG. 2 is a fragmentary perspective view of the sensor connection assembly of FIG. 1.

FIG. 3 is a sectional view taken along line 3—3 of FIG. 2.

DETAILED DESCRIPTION OF THE PRESENTLY PREFERRED EMBODIMENT

Figure 4:
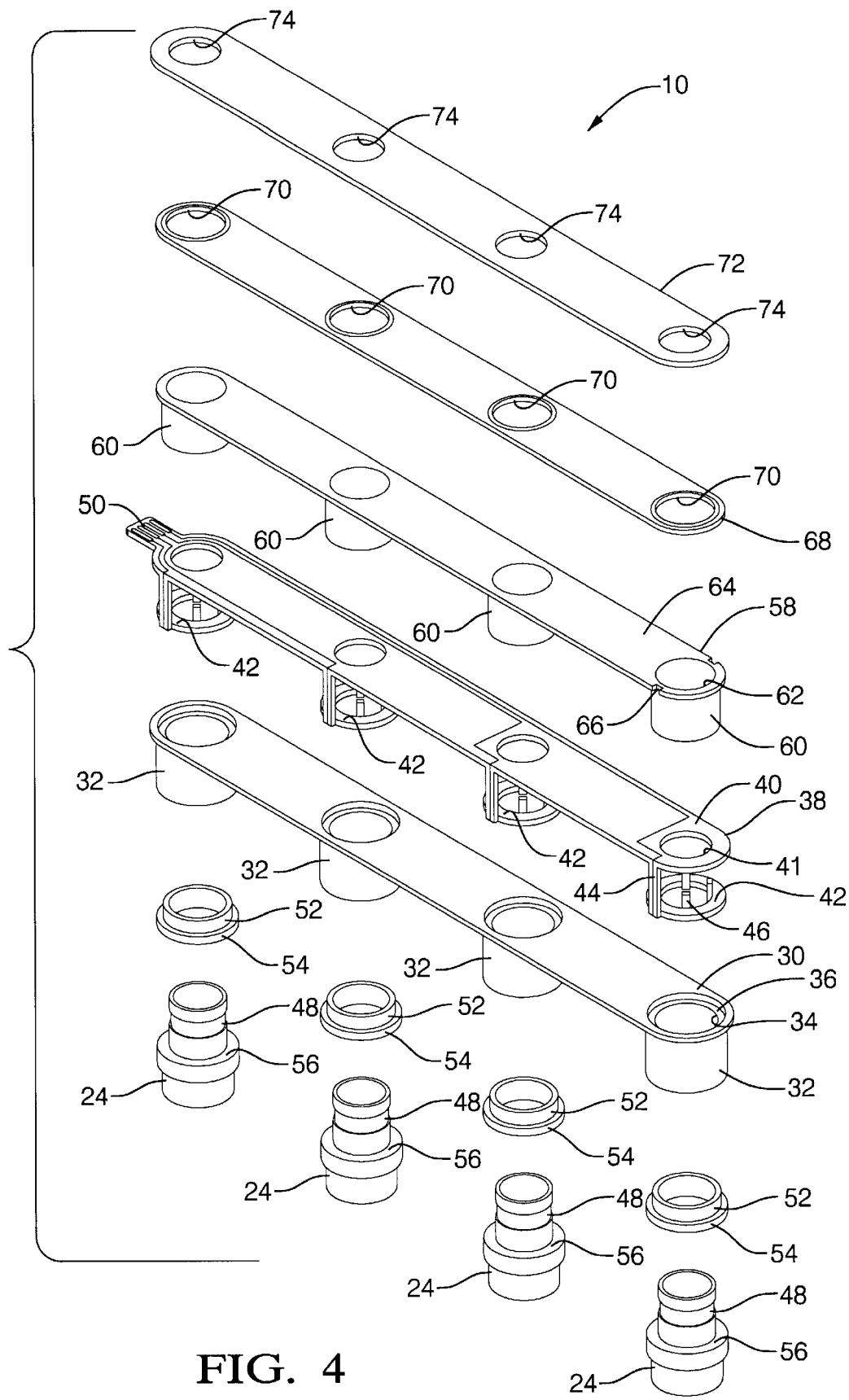
FIG. 4 is an exploded view of the sensor connection assembly of FIG. 1.

Referring to FIG. 1, a sensor connection assembly 10, according to the present invention, is illustrated in operational relationship with an engine, generally indicated at 12, such as an internal combustion engine. The engine 12 includes an engine block 14 such as an engine head having a combustion chamber 16. The engine block 14 is a machined metal structure having a spark plug boss 18 forming a well or pocket 20. The engine 12 includes a spark plug 22 disposed within the pocket 20. The engine 12 includes a cylinder pressure sensor 24 threadably engaged into the pocket 20 in a surrounding relationship to the spark plug 22. The sensor 24 is a piezoelectric type strain gage that can be calibrated to detect pressure in the combustion chamber 16 prior to actual combustion of a volatile gas/air mixture. An example of such a sensor is disclosed in co-pending application Ser. No. 08/902,765, filed Jul. 30, 1997, entitled "ELECTRICAL CONNECTOR WITH COMBINATION SEAL AND CONTACT MEMBER", the disclosure of which is hereby incorporated by reference. It should be appreciated that the sensor 24 is conventional and known in the art.

The engine 12 further includes the sensor connection assembly 10, according to the present invention, connected to the sensor 24 and an electronic controller (not shown) such as an engine controller. The engine 12 includes an ignition module (not shown) having a spark plug connector 26 attached to the spark plug 22 and passing through the sensor connection assembly 10. It should be appreciated that, except for the sensor connection assembly 10, the engine 12 is conventional and known in the art.

Referring to FIGS. 1 through 4, the sensor connection assembly 10 includes a generally planar connector housing 30 having at least one pocket 32 extending axially with an aperture 34 extending therethrough. The pocket 32 has an annular lead-in shoulder 36. The pocket 32 is generally cylindrical in shape and has a circular cross-section. The connector housing 30 extends longitudinally and is modular to accommodate a plurality of pockets 32, preferably up to four pockets 32. Preferably, the connector housing 30 is injection molded of a rigid material such as plastic. The connector housing 30 also has a connector shroud (not shown) at one end to provide an interconnect to the controller.

Referring to FIGS. 1 through 4, the sensor connection assembly 10 includes a flexible printed circuit 38 that is disposed in the pocket 32 of the connector housing 30 and fits onto an upper portion of the sensor 24. The printed circuit 38 has a planar circuit portion 40 having an aperture 41 extending therethrough and a planar base ring 42 with a generally circular shape disposed below the circuit portion 40. The printed circuit 38 has a lead 44 extending axially to interconnect the base ring 42 and the circuit portion 40. The printed circuit 38 also includes a plurality of, preferably five legs 46 extending axially from an inner diameter of the base ring 46 to contact an annular electrical contact ring or groove 48 on the sensor 24. The legs 46 are spaced circumferentially about the base ring 42 and spring or flex radially relative to the base ring 42. The printed circuit 38 is made of a relatively thin plastic material to allow it to be flexible. The printed circuit 38 extends longitudinally and is modular to accommodate a plurality of base rings 42, preferably up to four. The printed circuit 38 has a connector portion 50 disposed in the connector shroud to provide an interconnect to the controller. It should be appreciated that the groove 48 on the sensor 24 may be continuous or non-continuous.

The sensor connection assembly 10 also has a lower or bottom seal 52 disposed in the bottom of the pocket 32 of the connector housing 30. The bottom seal 52 is made of a silicone material or an elastomeric material. The bottom seal 52 is a ring extending axially that has a flange 54 extending radially at one end to engage a lower end of the pocket 32 and may abut a shoulder surface 56 of the sensor 24. It should be appreciated that the bottom seal 52 is integral, unitary and formed as one-piece.

The sensor connection assembly 10 also includes a middle seal 58 disposed within the connector housing 30. The middle seal 58 has a generally cylindrical seal portion 60 extending axially with an aperture 62 extending therethrough. The seal portion 60 is generally cylindrical in shape and has a circular cross-section. The middle seal 58 has a generally planar flange 64 extending radially to abut the shoulder 36 of the pocket 32. The flange 64 has at least one cut-out or slot 66 to allow the lead 44 of the printed circuit 38 to extend therethrough. The middle seal 58 extends longitudinally and is modular to accommodate a plurality of seal portions 60, preferably up to four seal portions 60. Preferably, the middle seal 58 is made of an elastomeric material or silicone material and formed as one-piece.

The sensor connection assembly 10 also includes an upper or top seal 68 inserted into the connector housing 30. The top seal 68 has an aperture 70 extending therethrough. The top seal 68 is a generally planar ring molded of a flexible elastomeric material such as silicone rubber. The top seal 68 aligns with a top housing 72 to be described and provides EMI protection from the spark plug 22, termination and wiring.

The sensor connection assembly 10 further includes a top housing or cover 72 to engage the top seal 68 and provide a top or cover for the connector housing 30. The top housing 72 is a generally planar ring having an aperture 74 extending therethrough. The top housing 72 is made of a rigid material such as stainless steel or the like to shield the sensor connection assembly 10 from ignition sources that are generated from a primary coil (not shown) located above the sensors 24. The top housing 72 is assembled onto the top of the connector housing 30 via snap locks or heat staking. The connector housing 30 and top housing 72 are secured to the engine block 14 by suitable fasteners such as bolts (not shown) which extend through apertures in the top housing 72 and connector housing 30, respectively, and provide a ground path for noise generated by the ignition module. Preferably, both the top seal 68 and top housing 72 extend longitudinally and are modular to accommodate a plurality of apertures 70 and 74, respectively, preferably up to four.

To assemble the sensor connection assembly 10, the connector housing 30 has one base ring 42 of the printed circuit 38 inserted into each pocket 32. The bottom seal 52 and middle seal 58 are inserted into each pocket 32 of the connector housing 30. The top seal 68 is disposed on top of the middle seal 58. The top housing 72 is assembled on the top of the connector housing 30. The complete module of the sensor connection assembly 10 is inserted into the pocket 20 of the engine block 14 and join 2, 3 or 4 sensors 24. The sensor connection assembly 10 is secured in place by bolts through apertures in the top housing 72 and connector housing 30, (not shown), locking the sensor connection assembly 10 into the desired position. The bolting action captures and secures the position and retains the sensor connection assembly 10 on the sensor 24. It should be appreciated that the bolts act as a ground path for unwanted H and E field intensities generated by the spark plug 22 that the sensor connection assembly 10 encompasses.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A sensor connection assembly for connection to a sensor in an internal combustion engine comprising:
   a connector housing; and
   a flexible printed circuit disposed in said connector housing and having a circuit portion, a base ring, a lead interconnecting said circuit portion and said base ring, and a plurality of legs extending axially from said base ring to contact an outer radial side periphery of the sensor to provide an electrical connection thereto.

2. A sensor connection assembly for connection to a sensor in an internal combustion engine comprising:
   a connector housing;
   a flexible printed circuit disposed in said connector housing and having a plurality of legs to contact the sensor to provide an electrical connection thereto;
   wherein said printed circuit has a circuit portion, a base ring and a lead interconnecting said circuit portion and said base ring, said legs extending axially from said base ring; and
   wherein said printed circuit is integral, unitary and formal as one-piece.

3. A sensor connection assembly as set forth in claim 2 wherein said connector housing is circular in shape.

4. A sensor connection assembly as set forth in claim 2 wherein said connector housing is made of a plastic material.

5. A sensor connection assembly as set forth in claim 2 including a bottom seal disposed in a lower end of said connector housing.

6. A sensor connection assembly as set forth in claim 5 wherein said bottom seal is made of a silicone material.

7. A sensor connection assembly for connection to a sensor in an internal combustion engine comprising:
   a connector housing;
   a flexible printed circuit disposed in said connector housing and having a plurality of legs to contact the sensor to provide an electrical connection thereto; and
   a middle seal disposed within said connector housing about said legs.

8. A sensor connection assembly as set forth in claim 7 including a top seal disposed adjacent said middle seal.

9. A sensor connection assembly as set forth in claim 8 including a top housing disposed adjacent said top seal and attached to said connector housing.

10. A sensor connection assembly for connection to at least one sensor in an internal combustion engine comprising:
    a connector housing having at least one pocket and an aperture extending therethrough; and a single flexible printed circuit disposed in said at least one pocket and having a circuit portion, a base ring, a lead interconnecting said circuit portion and said base ring, and a plurality of legs extending axially from said base ring to contact an outer radial side periphery of the sensor to provide an electrical connection thereto.

11. A sensor connection assembly for connection to at least one sensor in an internal combustion engine comprising:

a connector housing having at least one pocket and an aperture extending therethrough;

a flexible printed circuit disposed in said at least one pocket and having a plurality of legs to contact the sensor to provide an electrical connection thereto;

wherein said printed circuit has a circuit portion, a base ring and a lead interconnecting said circuit portion and said base ring, said legs extending axially from said base ring; and wherein said circuit portion, base ring, lead and legs are integral, unitary and formed as one-piece.

12. A sensor connection assembly as set forth in claim 11 wherein said pocket is circular in shape.

13. A sensor connection assembly as set forth in claim 11 including a bottom seal disposed in said pocket of said connector housing.

14. A sensor connection assembly as set forth in claim 11 including a top housing attached to said connector housing.

15. A sensor connection assembly for connection to at least one sensor in an internal combustion engine comprising:

a connector housing having at least one pocket and an aperture extending therethrough;

a flexible printed circuit disposed in said at least one pocket and having a plurality of legs to contact the sensor to provide an electrical connection thereto; and a middle seal disposed within said connector housing about said legs.

16. A sensor connection assembly as set forth in claim 15 including a top seal disposed adjacent said middle seal.

17. A sensor connection assembly for connection to at least one sensor in an internal combustion engine comprising:

a connector housing having at least one pocket and an aperture extending therethrough;

a flexible printed circuit disposed in said at least one pocket and having a plurality of legs to contact the sensor to provide an electrical connection thereto;

a top housing attached to said connector housing; and wherein said top housing is made of stainless steel.

18. A sensor connection assembly for connection to at least one sensor in an internal combustion engine comprising:

a connector housing having at least one pocket and an aperture extending therethrough;

a flexible printed circuit having a base ring disposed in said at least one pocket with a plurality of legs extending axially to contact the sensor to provide an electrical connection thereto;

a bottom seal disposed in said pocket;

a middle seal disposed in said pocket;

a top seal disposed adjacent said middle seal; and a top housing attached to said connector housing.

* * * * *